May 11, 1965

M. M. HIRSCH 3,183,438

MODULATED POWER MEASURING BRIDGE WITH AUTOMATIC
A.C. AND D.C. REBALANCING

Filed March 8, 1960

INVENTOR:
MAX M. HIRSCH
BY Howson & Howson
ATTYS.

May 11, 1965 M. M. HIRSCH 3,183,438
MODULATED POWER MEASURING BRIDGE WITH AUTOMATIC
A.C. AND D.C. REBALANCING
Filed March 8, 1960 5 Sheets-Sheet 3

INVENTOR:
MAX M. HIRSCH
BY Howson & Howson
ATTYS.

May 11, 1965  M. M. HIRSCH  3,183,438
MODULATED POWER MEASURING BRIDGE WITH AUTOMATIC
A.C. AND D.C. REBALANCING
Filed March 8, 1960                                     5 Sheets-Sheet 4
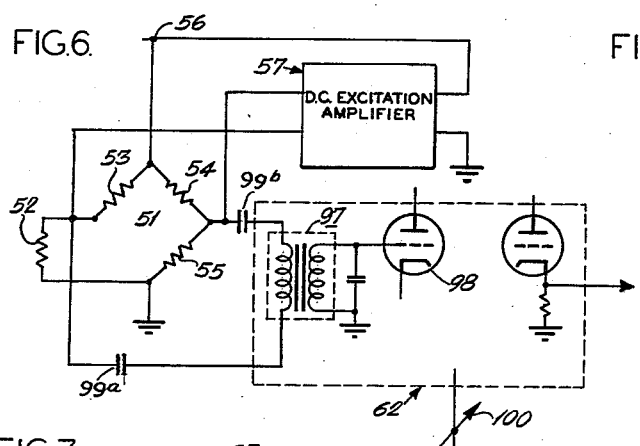
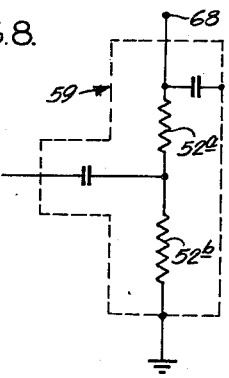
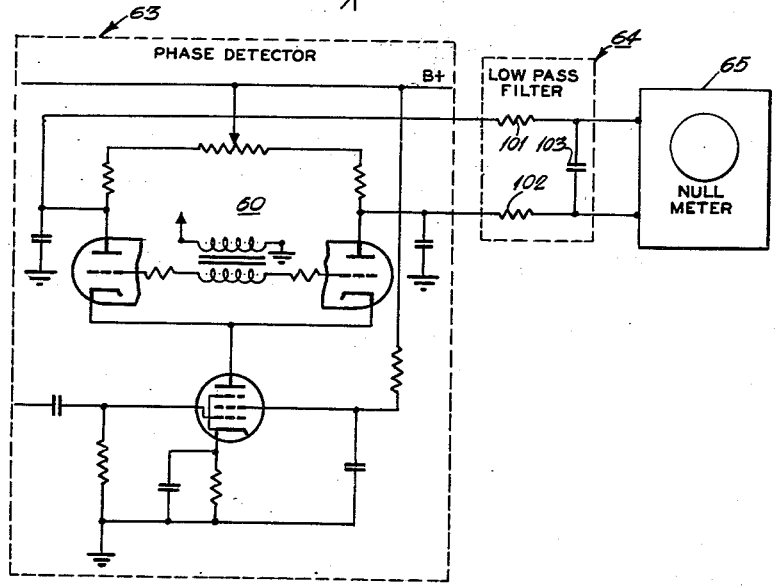
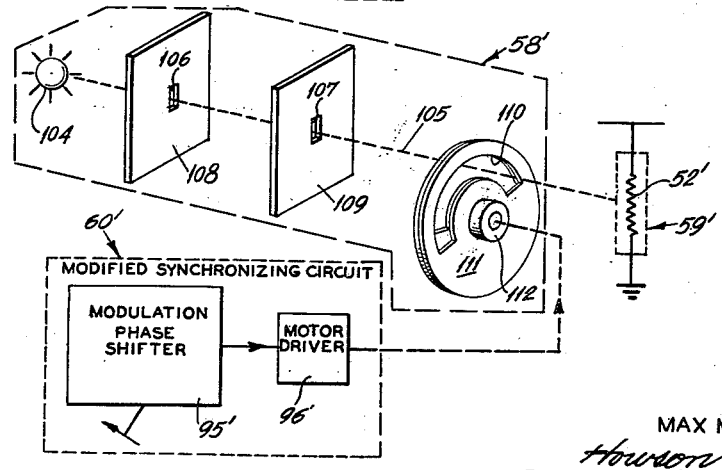
INVENTOR:
MAX M. HIRSCH
BY Howson & Howson
ATTYS.

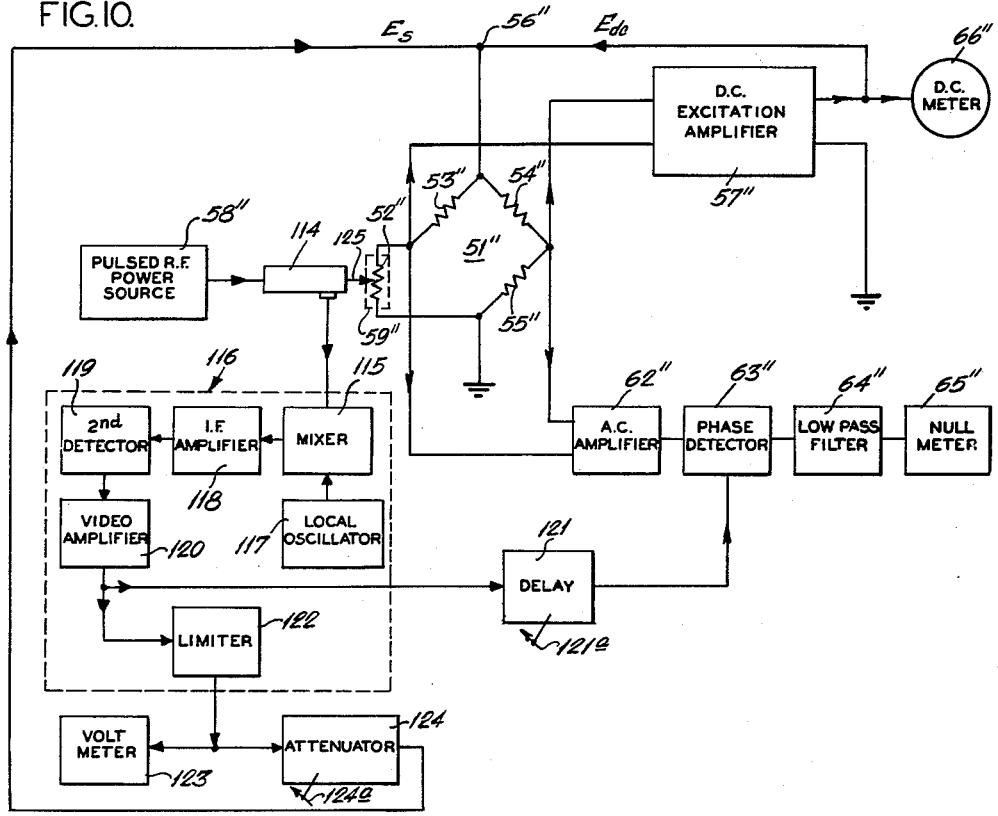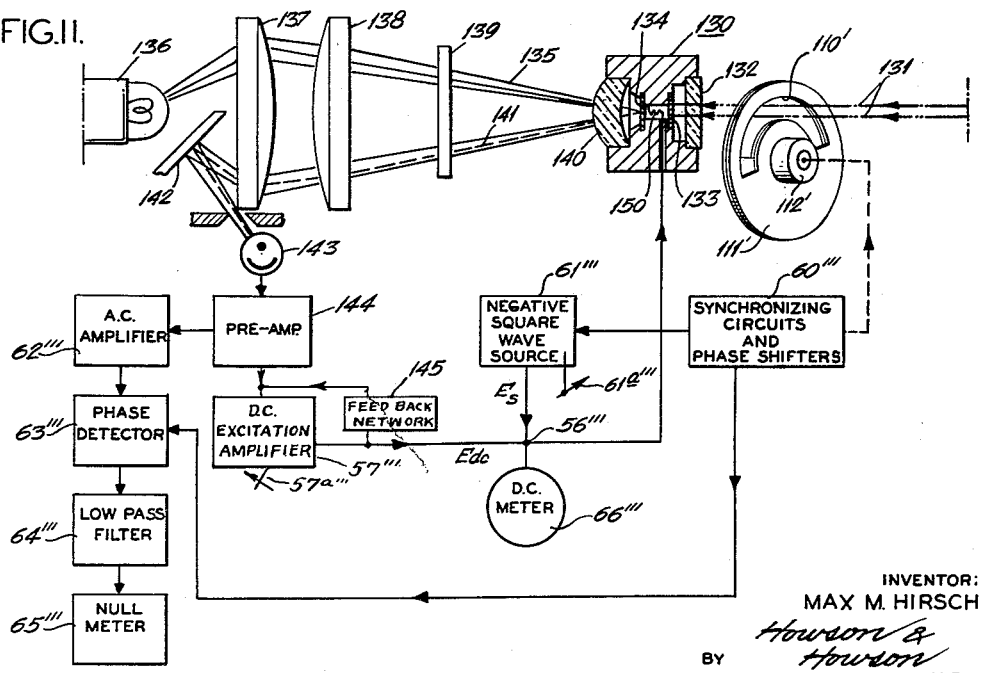

United States Patent Office 3,183,438
Patented May 11, 1965

3,183,438
MODULATED POWER MEASURING BRIDGE WITH AUTOMATIC A.C. AND D.C. REBALANCING
Max M. Hirsch, Philadelphia, Pa., assignor, by mesne assignments, to the United States of America as represented by the Secretary of the Army
Filed Mar. 8, 1960, Ser. No. 13,480
2 Claims. (Cl. 324—106)

The present invention relates, in general, to a method for measuring power of alternating currents, radio waves, microwaves and from radiant sources of various types. Measurement can occur over a great range of frequencies of electromagnetic energy from below a kilocycle per second to above the ultraviolet. This method employs the principle of the thermal equivalence of different kinds of energy with accuracy and extreme sensitivity over a great dynamic range. The invention also relates to apparatus for practicing the method of the present invention.

Thermal detectors such as bolometers and the Golay cell have been used for many years and are well known as power sensing elements. Although they may also be employed for making absolute measurements, when used as detectors the sensitivity of these devices is more fully exploited. As detectors they may detect power levels as low as $10^{-9}$ to $10^{-11}$ watts. In such use the power applied to the detector is modulated so that an alternating output of the detector can be applied to a high gain linear amplifier. Modulation may be accomplished with a 100 percent square wave or with pulses. If the gain and linearity of the amplifier are known and constant, the arrangement can be calibrated with known amounts of power at higher levels. The accuracy of measurement depends upon constancy and linearity of the amplifier.

When used for absolute measurements in bridge circuits bolometers are capable of good accuracy but at the expense of greatly reduced sensitivity. The technique commonly used for absolute measurements is to measure the unknown power from an A.C., radio, or radiant source by actually measuring the reduction of exciting power into the bolometer necessary to maintain the bolometer at the same resistance it had before the unknown power was applied. This is frequently accomplished by connecting the bolometer into some kind of bridge circuit. The unknown power being measured may be represented as follows:

$$\Delta P = 2i(\Delta i)R$$

Here $\Delta P$ is the power fed into the bolometer to be measured, $i$ is the exciting current which may be a direct current or a root-mean-square value of an alternating current, $\Delta i$ is the current change, and R is the bolometer resistance. The total power into the bolometer remains the same as the exciting power is reduced an amount, $\Delta P$, equal to the amount of power, from a radiant or A.C. source, that is to be measured. The bolometer changes its resistance with temperature, which in turn depends upon the power it must dissipate.

The sensitivity of this method has been limited to about 0.1 milliwatt ($10^{-4}$ watts) by the measuring of $i$, $\Delta i$, and R (or their equivalents) and thermal instability. The resistance R of the bolometer is generally kept fairly constant by putting it in a Wheatstone bridge that is balanced manually or by automatic circuits. Generally $i$ and $\Delta i$ are measured by the same means. Since $i$ is very much larger than $\Delta i$ for small power levels the precision in measuring $\Delta i$ is a limiting factor. While means have been devised to separate the measurement of $i$ and $\Delta i$ such as shown in, Glenn F. Engin's "Self Balancing Direct Current Bridge for Accurate Bolometric Power Measurements," Journal of Research of the NBS, vol. 59, No. 2, August 1957, p. 101, et seq., another limitation of amplifier noise and instability is introduced that again limits the lower level of power measurement. Another and more serious limitation has been temperature instability. Any thermal equivalent power detector changes its temperature in response to applied power. This action is reversible, a small change of temperature such as normal fluctuation of the ambient temperature gives the effect of an applied varying power. While circuits have been devised to compensate for this effect, the sensitivity of absolute measurements have been many orders below the sensitivity of the thermal devices already on the commercial market. The method of the present invention and the systems using that method sense differences in a thermal device caused by ambient temperature variations and differences caused by applied unknown power as two quite distinct signals.

The method and the systems disclosed herein are the consequence of a search made to learn how the ultimate sensitivity of bolometers could be utilized. Dahlke and Hettner in the Z. Physica, 117, 74, 1940, and more recently Van der Ziel in "Noise," Prentice-Hall Inc., 1954, New York, p. 410, give the ultimate sensitivity of $3.9 \times 10^{-12}$ watts for a bolometer of one square millimeter of surface with a time constant of one second, and a temperature of 300° K., room temperature, under several conditions including the rather ideal condition that all heat loss is by radiation.

The method of the present invention and the systems employed when the thermal device is a bolometer include the two modes of operation of a bolometer mentioned above with several novel features. The bolometer is in a bridge and the unknown power applied to the bolometer is modulated. The excitation power to the bridge is also modulated so that the excitation power applied to the bolometer is reduced synchronously with the applied unknown power and is adjustable so that substantially the instantaneous sum of the two are zero. Lack of balance, or inequality of the unknown power and the reduced excitation power, periodically changes the bolometer resistance, which is detected by an amplifier at the bridge output. Since this amplifier only detects balance or unbalance its gain variations do not affect the accuracy. Apart from the balance of the modulated unknown and excitation powers, unbalance caused by ambient temperature variations changing the bolometer resistance is detected, amplified and used to control the excitation power to restore bridge balance. The two kinds of unbalance caused by ambient temperature variation and inequality of unknown with excitation power reduction are separated on a time or frequency basis. The reduced excitation power is measured as an absolute quantity. The accuracy of measurement of its least value does not depend on the value of the total excitation power. The accuracy of the reduced excitation power does depend upon the accuracy with which the total excitation power is measured. This system offers a long sought solution to the problem of calibrating radio receivers of all frequencies and provides a means for calibrating noise sources by primary standards.

The method of the present invention is applied in systems using other thermal devices, such as a Golay cell. The details of such a system are described hereafter. The Golay cell with slight modifications necessary for its functioning in the system is rendered capable of measuring radiant energy in absolute quantities. It also becomes a means of measuring absorption characteristics and other optical properties of films.

It is an object of this invention to provide a novel ultra sensitive meter for measuring very low levels of power of radio waves and microwaves.

Another object of this invention is to provide a direct reading, or self-calibrating, ultra sensitive meter for measuring very low levels of radiant power.

A further object of this invention is to provide an ultra sensitive meter for measuring very low levels of power produced by alternating currents in terms of direct current power.

Still another object of this invention is to provide a power meter for measuring power over a great dynamic range with precision.

Another object of this invention is to make thermal power detecting devices into power measuring devices.

Another object of this invention is to provide a means for measuring the radiant power absorption characteristics of films.

Another object of this invention is to provide a sensitive meter for measuring the power of microwaves and to show a constant impedance to the source of microwave energy.

Another object of this invention is to provide a very sensitive meter for measuring the power of pulsed microwaves.

Another object of this invention is to provide a direct reading high frequency power indicating device internally calibrated in values of voltage and resistance.

Another object of this invention is to provide a sensitive method for compensating for ambient temperature variations in thermal power sensing devices.

Another object of this invention is to provide a very broadband microwave detector that is also very sensitive.

Another object of this invention is to provide a radio frequency sensitive power meter that operates over a broad band of frequencies.

Another object of this invention is to provide a means of measuring pulsed radio frequency power very sensitively.

Another object of this invention is to provide a means of measuring pulsed microwave power very sensitively and in terms of voltage and resistance.

Another object of this invention is to provide a self-balancing means of measuring power very sensitively.

Another object of this invention is to provide an active means of temperature compensating thermal detectors.

Another object of this invention is to provide a constant temperature thermal detector.

In the drawings:

FIG. 6 is a circuit diagram showing the connection of the A.C. amplifier to the basic bridge.

FIG. 7 is a circuit diagram of the phase detector and low pass filter.

FIG. 8 is a schematic diagram of a bolometer mount.

FIG. 9 is a symbolic diagram of the optical elements of a direct reading modulated power meter for radiant power.

FIG. 10 is a block circuit diagram of a direct reading modulated power for R.F. pulse power measurements.

FIG. 11 is a block diagram of a direct reading modulated power meter with a Golay detector.

Figure 1:
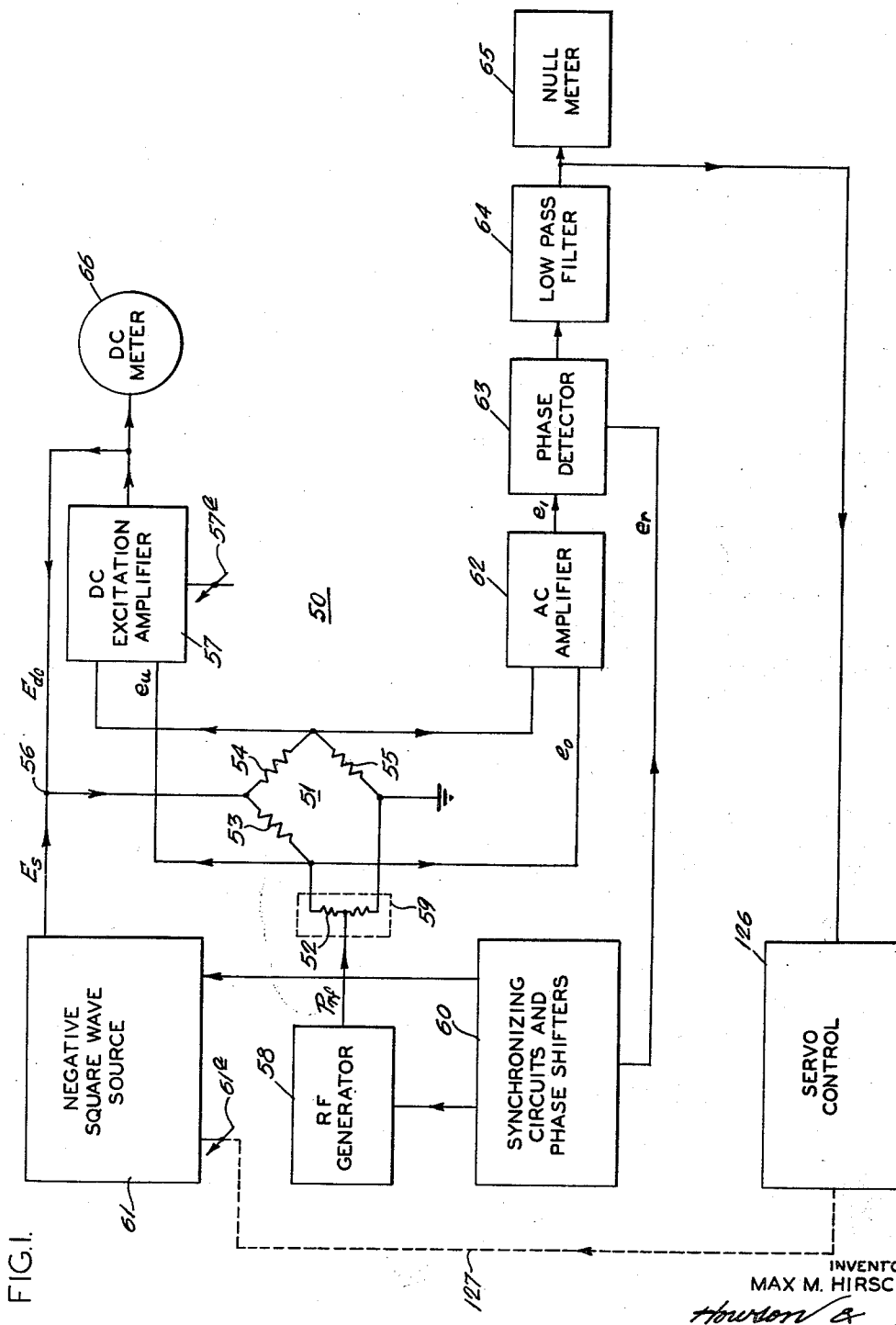
FIG. 1 is a block diagram schematically representing a direct reading modulated power meter with a D.C. bolometer bridge.

Referring now to the block diagram of FIG. 1 there is shown a direct reading modulated power meter specifically arranged for the measurement of radio frequency power. This system includes a basic bolometer bridge 51 composed of bolometers 52 and three fixed resistors 53, 54 and 55, which are not variable upon changes in temperature for the power they are rated to dissipate. The bolometer is a nonlinear resistance, the value of which changes greatly with the application of power to the element or with a change in its temperature. Elements whose resistance increase with temperature are called barretters. A barretter is usually a fine wire filament. On the other hand, elements whose resistance decreases with an increase of temperature are called thermistors. A thermistor is usually made of a semi-conducting material. The bolometer bridge shown here may be used with either kind of elements, but a barretter has been selected for this discussion to demonstrate the operation of the bridge.

An excitation voltage $E_{dc}$ is applied across the bridge from the junction 56 at the top of the bridge 51 to ground by means of the D.C. excitation amplifier 57. Amplifier 57 applies power to each of the elements in the bridge including bolometers 52, which increase in resistance while the other resistors 53, 54, and 55 remain substantially fixed. The resistance of bolometers 52 increase until the ratio of their resistance to that of resistor 53 is approximately equal to the ratio of the resistances of resistor 55 to resistor 54. In this preferred embodiment the resistance of the several fixed resistors, 53, 54 and 55 are all equal to some nominal value R. The bolometers 52 also assume this value of resistance R, approximately, but the bridge balance is imperfect and puts out a D.C. error voltage, $e_u$. This voltage is amplified by the D.C. excitation amplifier 57 having an amplification factor $G_0$. The bridge excitation voltage, $E_{dc}$ is the sum of two voltages, $E_i$ and $E_a$, i.e., $E_{dc}=E_i+E_a$, wherein $E_a=e_uG_0$. The voltage $E_i$ is a D.C. insertion voltage manually adjustable by control 57a. The D.C. error voltage $e_u$ may be made as small as desired by making $G_0$ large and bringing $E_i$ close to a particular value of $E_{dc}$, hereafter called $E_b$, that gives perfect balance of the bridge. If the bridge excitation $E_{dc}$ is too large, the resistance of bolometer 52 will be too great. This causes the D.C. error voltage $e_u$ to become positive and, because of the selected polarity of the amplifier 57, $E_{dc}$ is caused to decrease. Conversely, if $E_{dc}$ is too small, the resistance of bolometer 52 will be too small and cause $e_u$ to become negative. The amplifier 57 will then cause $E_{dc}$ to increase. The operation of the D.C. excitation amplifier 57 and the basic bridge 51 is such as to maintain the basic bridge close to a perfect balance. This balance will be maintained in the presence of ambient temperature changes because the bridge-amplifier loop constitutes an active temperature compensatating means. It also keeps the bolometer at a constant resistance so that it shows the R.F. source of the R.F. generator 58 a constant impedance.

Figure 2A:
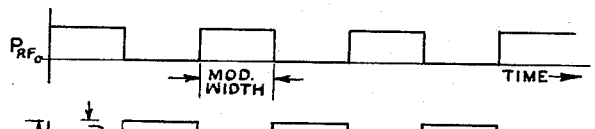
FIG. 2a represents the waveform of the modulated radio frequency power envelope.

The R.F. generator 58 is 100 percent square wave modulated. FIG. 2a graphically shows a square wave modulated radio frequency power envelope. The frequency, or range of frequencies, selected for the generator depends upon the radio frequency characteristics of the mount 59 in which the bolometers 52 are inserted. The carrier frequency of the R.F. generator may be any frequency from below 100 kcs. to 100,000 mcs. Hewlett-Packard radio frequency generator model 606A and Narda bolometer mount, model 560, are typical generators useful at the lower end of this range. Power envelope modulation is controlled by signals from synchronizing circuits and phase shifters 60 that are connected to R.F. generator 58 as seen in FIG. 1.

The R.F. generator 58 is coupled to the bolometer 52, in bolometer mount 59 as shown schematically in FIG. 1. The R.F. power, $P_{rf}$, generated by generator 58 and transferred to bolometer 52 would ordinarily cause the bolometer resistance to increase. However, a negative square wave of amplitude $E_s$ from negative square wave source 61 is applied to the basic bolometer bridge 51 at junction 56. The output of the negative square wave source 61 is synchronized relative to the square modulation envelope shown in FIG. 2a by signals from synchronizing circuits and phase shifters 60 to which it is connected. The total voltage waveform applied to the basic bridge 51 is shown graphically in FIG. 2b to be of the same frequency as but opposite phase from the square wave envelope of FIG. 2a. The D.C. power applied to the bridge 51 and hence the D.C. power absorbed by the bolometer 52 is periodically reduced by the negative square wave $E_s$. Since these square waves are of the same frequency but opposite phase, the periodic reduction in D.C. power to the bolometer is synchronous with the periodic application of R.F. power. The synchronism results from the fact that both the R.F. generator 58 and negative square wave source are timed by a common source, the synchronizing circuits and phase shifters 60. The negative square wave amplitude, $E_s$, can then be adjusted in the source 61 by control 61a to make the periodic reduction in D.C. power to bolometer 52 equal to the R.F. increase in power, so that the total periodic change in power applied to the bolometers 52 is zero.

Figure 2B:
FIG. 2b represents the waveform of total voltage applied to bridge.
Figure 2C:
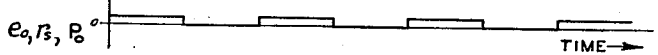
FIG. 2c represents the waveform of total differential power $P_0$, periodic resistance change $r_s$, and A.C. bridge output $e_0$ when R.F. power is greater than the differential excitation power.
Figure 2D:
FIG. 2d represents the waveform of the fundamental of the bridge output passed by A.C. amplifier, $e_1$, when R.F. power is excessive.

If, on one hand, the total differential power applied to the bolometer, $P_0$, is not exactly zero but is slightly positive (that is, the R.F. power is greater than the reduction in D.C. power) the bolometer will experience a periodic positive resistance change, $r_s$, that is synchronous with $P_0$ when the time constant of the bolometer is much less than $T/2$, the half period of the square wave modulation. This will cause a synchronous square wave output voltage, $e_0$, from bridge 51 that is applied to A.C. amplifier 62 to which the output of bridge 51 is also connected. The waveforms of $P_0$ $r_s$, and $e_0$ are approximately the same shape and are shown in FIG. 2c. The A.C. amplifier has a center frequency, $1/T$, where T is the modulation period. It has a narrow passband so that only the fundamental, $e_1$, shown in FIG. 2d, passes through.

Figure 2E:
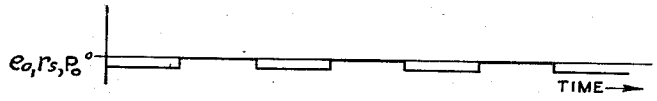
FIG. 2e represents the waveform of $P_0$, $r_s$, and $e_0$ when R.F. power is less than the differential excitation power.
Figure 2F:
FIG. 2f represents the waveform of the fundamental of the bridge output passed by A.C. amplifier, $e_1$, when R.F. power is deficient.

If, on the other hand, the total differential power applied to the bolometer, $P_0$, is negative (that is, the reduction in D.C. power caused by $E_s$ is greater than the R.F. power) the bolometer will experience a periodic reduction of resistance, $r_s$, that is synchronous with $P_0$, and the bridge square wave output, $e_0$, will now be negative. Their waveforms are shown in FIG. 2e. The output of the A.C. amplifier 62 is again the fundamental, $e_1$, but the phase is shifted 180 degrees, as shown in FIG. 2f.

Figure 2G:
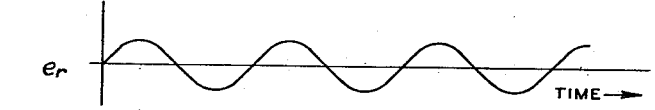
FIG. 2g represents the waveform of the reference voltage applied to the phase detector.

The A.C. amplifier 62 is connected to phase detector 63, and feeds its output, $e_1$, into it. $G_1$ is the voltage gain of amplifier 62. The synchronizing circuits and phase shifters 60 is also connected to the phase detector 63 and feeds a reference signal $e_r$, shown graphically in FIG. 2g, to a second input. When the first input signal $e_1$ and the reference input signal $e_r$ are in phase, as shown in FIG. 2g, the phase detector 63 puts out a positive D.C. voltage that is proportional to the amplitude of $e_1$. When the two signals are out of phase, the phase detector 63 puts out a negative D.C. voltage.

The phase detector 63 is connected to a low pass filter 64 with a long time constant. The phase detector, in turn, is connected to a null meter 65. The D.C. output of the phase detector 63 thus passes through filter 64 where it is smoothed, to the null meter 65 where it indicates a D.C. voltage. The polarity of the D.C. voltage indicates the sense of the unbalance. If the voltage is positive, the R.F. power exceeds the periodic reduction of D.C. power. If the voltage is negative, the R.F. power is less than the periodic reduction of D.C. power. The magnitude of the voltage indicates the degree of unbalance. In practice, if a given R.F. signal were being measured, the negative square wave voltage $E_s$ would be adjusted through control 61a of the negative square wave source 61 until the D.C. voltage on the null meter 65 was zero.

The R.F. power, $P_{rf}$, balanced by the negative square wave is calculated from the following formula:

$$P_{rf} = \frac{E_s(2E_{dc} - E_s)}{4R}$$

where $E_s$ is the value of the negative square wave voltage; $E_{dc}$, the steady D.C. excitation voltage; and R is the bridge resistance (or the resistance of each of the bridge legs, i.e., the resistance of bolometer 52). The D.C. excitation voltage $E_{dc}$ is measured by a D.C. meter 66 that is connected to the junction 56 at the top of bridge 51. The control 61a of the negative square wave source 61 is calibrated and its setting measures the negative square wave voltage $E_s$.

The D.C. balance of the bridge affected by the D.C. excitation amplifier 57 must be good, that is, the D.C. error, $e_u$, must be small. A negative square wave applied to junction 56 will cause a spurious A.C. bridge output equivalent to $e_0$ into A.C. amplifier 62 if the bolometer resistance is not equal to R, where $$e_0 = \frac{sE_sE_B^2(\delta - p)}{8R^2}$$

Here $s$ is the bolometer sensitivity; $E_B$ is the value of D.C. excitation voltage $E_{dc}$, that causes perfect balance; $p$ is the proportional error in D.C. excitation, $$p = \frac{P_{rf} - \frac{E_s(2E_{dc} - E_s)}{4R}}{\frac{E_s(2E_{dc} - E_s)}{4R}}$$

In order that $e_0$ indicate unbalance of R.F. and reduced D.C. power, $p$ must be so much smaller than $\delta$ as to be negligible, for example, if $\delta$ is taken as 1% then $p$ should be on the order of 0.01%. The voltage gain $G_0$ required in the D.C. excitation amplifier 57 can be calculated from the formula $$G_0 = \frac{8R^2(E_B - E_i)}{psE_B^3}$$

The best commercial bolometers whose sensitivity $s$ is about 5000 ohms per watt, and with $(E_B - E_i) = 0.1$ volt the overall voltage gain $G_0$ required is about 2000 for $p = 0.01\%$.

Figure 3:
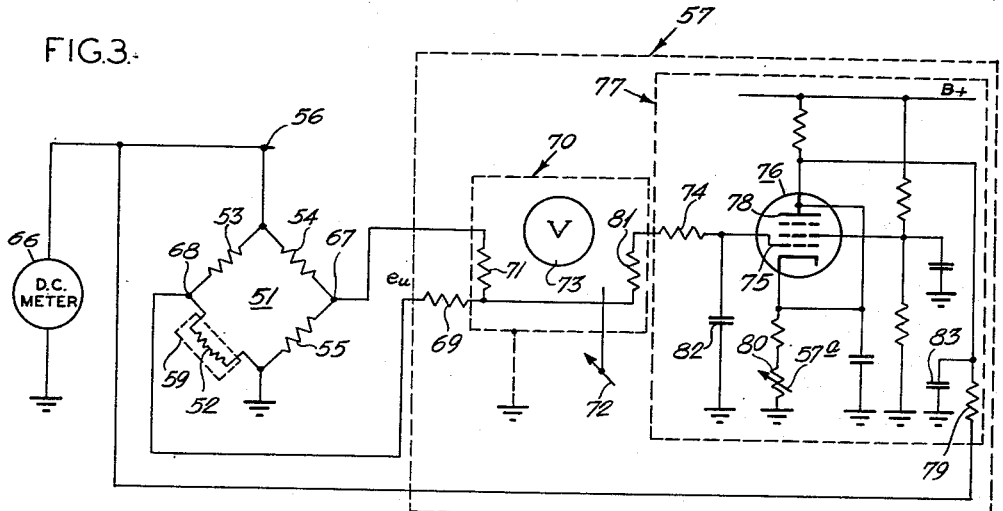
FIG. 3 is a circuit diagram showing essential features of the D.C. excitation amplifier.

Referring now to FIG. 3, the essential features of the D.C. excitation amplifier 57 are shown and that amplifier is shown connected to the basic bolometer bridge 51. The output terminals 67 and 68 of the bridge 51 are connected to the D.C. excitation amplifier 57. Terminal 68 adjacent bolometer 52 is connected to a resistor 69, which in turn is connected to the low side of the input of D.C. amplifier and voltmeter 70. Terminal 67 is connected to the high side of the input of amplifier-voltmeter 70 which has an equivalent input resistance here designated 71. The low side of amplifier 70 is floating, i.e., not directly grounded. The D.C. amplifier and voltmeter 70 is typical of commercially available units such as the Kin Tel Model 204A. It is capable of measuring small voltages in the order of microvolts as well as relatively large voltages. The voltages it measures are indicated by the setting of a stepped gain control 72 and a meter 73. The high side of the output of amplifier 70 is connected to resistor 74 which, in turn, is connected to the control grid 75 of pentode 76 that is part of current amplifier 77. The plate 78 of pentode 76 is connected to resistor 79, which in turn is connected to junction 56 at the top of bridge 51. D.C. insertion control 57a adjusts variable resistance 80 in the cathode circuit of current amplifier 77.

With zero signal voltage into grid 75 current amplifier 77 supplies current to bridge 51 equivalent to voltage $E_{dc}$ at junction 56. Any D.C. unbalance is indicated in meter 73. Control 57a can be adjusted to bring the unbalance voltage very close to zero, i.e., several microvolts, and much closer than the 0.1 volt that the analysis above requires. Furthermore, the overall gain $G_0$ of the D.C. excitation amplifier 57 can be made greater than the 2000 required by the analyses above by adjusting the gain control 72 of amplifier 70.

In operation, any unbalance in bridge 51 caused by a change in ambient temperature, or some other circumstance, sends a D.C. voltage $e_u$ from terminals 67 and 68 to the input of amplifier 70. Here it is amplified and transmitted to the current amplifier 77 that increases or decreases the current it sends through bridge 51 with such polarity as to correct the unbalance as previously described.

It is apparent that grid 75 is connected to ground through resistor 74, the output resistance 81 of amplifier 70, then through two parallel paths. The first parallel path is through resistor 69 to junction 68 thence to ground through the bridge. The second parallel path is through resistor 71 to junction 67 and then through the bridge to ground. Resistor 74 is large, preferably on the order of 1 megohm, to limit the grid current. Resistor 69 is equal in value to resistor 71 which causes currents to divide approximately equally through the bridge and preserves D.C. balance. Grid current is subject to considerable fluctuation and the equal division of the grid current through the bridge also reduces this flow as a source of noise.

Capacitor 82 preferably has a value on the order of 0.1 microfarad and with resistor 74 forms a low pass filter of 0.1 second time constant. This order of time constant prevents oscillation caused by the non-linear resistance of the bolometer 52 in the feedback loop of the bridge 51 and the D.C. excitation amplifier 57. Capacitor 83 has a large value and acts as a noise and hum filter.

The overall time constant of the D.C. excitation amplifier 57 is a great many times the period of the R.F. modulation so as not to dampen the A.C. output of the bridge. For the D.C. meter 66, a peak reading voltmeter with high input resistance is chosen, since the maximum value of the excitation voltage $E_{dc}$ is the significant parameter to be measured (see FIG. 2b).

Figure 4:
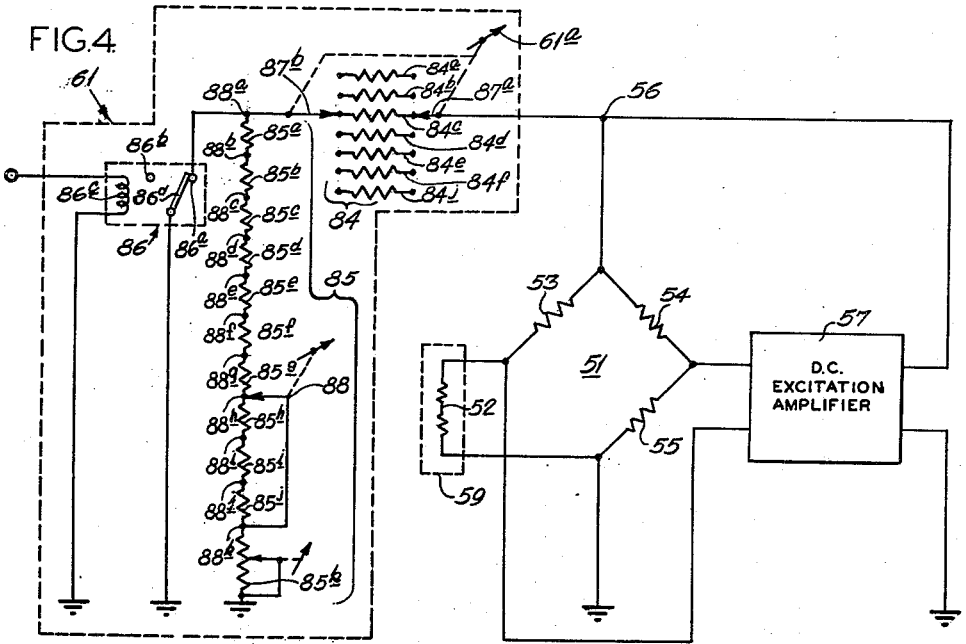
FIG. 4 is a schematic circuit diagram of a chopper switched shunt type negative square wave source.

FIG. 4 schematically shows a chopper switch shunt connected to the bridge 51 and the D.C. excitation amplifier 57 to provide a negative square wave source 61. The circuits of FIG. 4 are represented by the equivalent circuit of FIG. 4a. The principle of operation consists of periodically shorting one of two resistors connected in parallel with bridge 51. The periodically reduced resistance in the shunt, periodically reduces the current through bridge 51 and effectively supplies a negative square wave at junction 56. Selected resistance $R_1$, 84, and selected resistance $R_2$, 85, comprise the resistance shunt. The chopping action is preformed by chopper 86 having a switch arm 86d which moves from contacts 86a to contact 86b. When against contact 86a the junction of composite resistors 84 and 85 is connected to ground shorting out resistors 85. Contact 86b is disconnected from ground so that when arm 86d leaves contact 86a the resistors 85 are again in the circuit. A magnetic coil 86c causes arm 86d to move from one contact to the other in accordance with its energization. By periodically shorting out the resistance of the shunt 85, switch 86 periodically reduces the current through the bridge 51. As the arm 86d is periodically opened and closed to contact 86a it effectively supplies a negative square wave at junction 56. The resistance of resistor 84 and resistance $R_2$ of resistor 85 comprise the shunt resistance when the switch is open. When resistor 85 is shorted to ground, only resistor 84 having $R_1$ resistance if left in parallel with bridge 51.

Figure 4A:
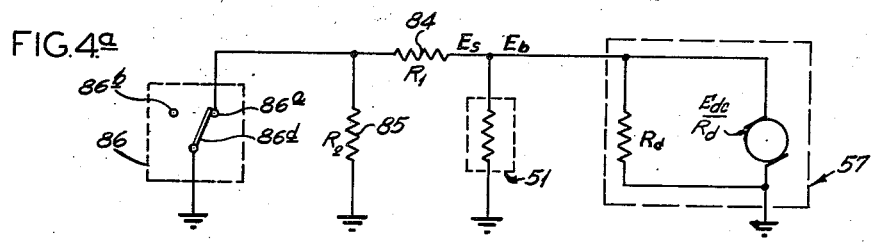
FIG. 4a is an equivalent circuit of the chopper switched shunt of FIG. 4.

Returning to FIG. 4, the resistor 84 in FIG. 4a represents the bank of resistors 84a to 84g. Any one of these resistors can be selected by switch means 87a and 87b which is the means operated by control 61a. The selected resistor is connected between junction 56 and contact 86a of chopper switch 86. Resistors 84a to 84g are provided in sufficient steps to establish the broad dynamic range. Resistor 85 in FIG. 4a actually consists of a string of resistors 85a to 85k preferably of equal size and connected in series as shown in FIG. 4. One end of resistor string 85 is connected at the junction of contact 86a and resistor chain 84. Between resistor 85a and contact 86a and between each pair of resistors 85a to 85k is a switch contact, contacts 88a to 88k. The common pole of switch 88 is connected to contact 88k and an arm which is movable to any one of contacts 88k to 88a to short out any selected number of the resistors 85j to 84a. Switch 88 thereby provides means for changing the effective resistance $R_2$ of resistor chain 85 in steps. Resistor 85k is a rheostat whose adjustment provides a fine continuous control of resistance $R_2$. The total resistance of rheostat 85k is selected as large as one the resistor i.e. 85a a continuous adjustment is provided over the full range of resistance.

Referring again to FIG. 4a wherein the equivalent circuit of the chopper switched shunt of FIG. 4 is shown. The D.C. excitation amplifier 57 may be shown and is here represented by a constant current source of current $$\frac{E_{dc}}{R_d}$$

in parallel with resistance $R_d$ according to Norton's theorem. The basic bridge 51 has a resistance equivalent to R. When switch 86 is closed to contact 86a, resistor 85 is shorted and the current through bridge 8 decreases causing a reduction in D.C. voltage, $E_s$.

$$E_s = \frac{E_{dc} R_2 R_t}{R_1^2 \left(1 + \frac{R_t}{R_1}\right)\left(1 + \frac{R_t + R_2}{R_1}\right)} \text{ and } R_t = \frac{R_d R}{R_d + R}$$

For small values of radio frequency power, $P_{rf}$, when $E_s$ is much less than $E_{dc}$ and $R_1$ is much greater than $(R_t + R_2)$, $$P_{rf} = \frac{E_{dc}^2 R_2 R_t}{2 R R_1^2}$$

Large values of radio frequency power, $P_{rf}$, can be accurately measured that approaches the value of the D.C. excitation power in the bolometer $$\frac{E_{dc}^2}{4R}$$

For such values of $P_{rf}$, $E_s$ approaches $E_{dc}$ and the condition that $R_1$ is much greater $(R_t + R_2)$ does not hold. $P_{rf}$ must then be measured according to both the complete expressions, $$P_{rf} = \frac{E_s(2E_{dc} - E_s)}{4R}$$

and the expression for $E_s$ given above.

For accuracy of measurement it is desirable that $R_d$ be large and unvariable. Resistor 79 in series with the bridge load 51 (see FIG. 3) makes the current source resistance have such a value.

From the above considerations the selection of resistors in bank 84 and series 85 can be understood. Resistance of the several resistors 84a to 84g is chosen to be of such a value as to change the R.F. power by a factor of 10 for each resistor change. Thus each movement of control 61a changes the R.F. power by a decade (10 db) and gives a coarse control. Each of the series resistors, 85a to 85j, has the same value and since there are ten, adjustment of control gives a medium control in steps of 0.1 of the power level selected by control 61a. Rheostat 85k has a maximum resistance equal to the resistance of each of the resistors, 85a to 85j. It will thus be appreciated that control 61a schematically shown in FIG. 1 may be complex control involving three adjustments which together permit continuous fine control over the entire range of operation. Of course other combinations of resistors may be chosen to read, for example R.F. voltage in decade steps.

Driving coil 86c of the chopper switch 86 receives an A.C. driving current from synchronizing circuits and phase shifters 60 that causes its grounded armature 86d to close periodically on contact 86a.

Figure 5:
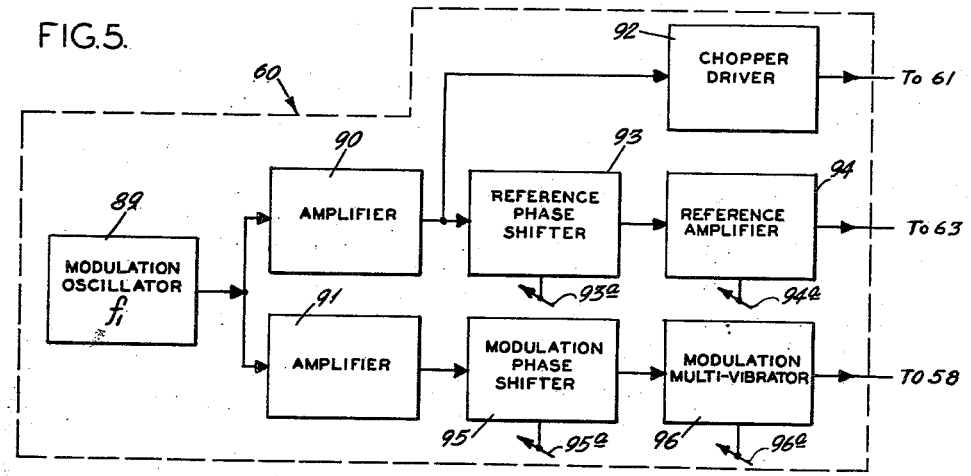
FIG. 5 is a block diagram of the synchronizing and phase shifters unit.

The synchronizing circuits and phase shifters 60, as shown in FIG. 1, is connected to send synchronized signals to the negative square wave source 61, the R.F. generator 58, and the phase detector 63. In FIG. 5 a block diagram of the synchronizing circuits and phase shifter 60 is shown. As oscillator 89 generates the basic modulation signals. Oscillator 89 is connected to buffer amplifiers 90 and 91. Amplifier 90 is connected to a chopper driver 92 and reference phase shifter 93. The output of the chopper driver is connected to the driving coil 86c of the chopper 86 in negative square wave source 61. The signals that originate in oscillator 89 are amplified in buffer amplifier 90. While the input to and output from the driver 92 is sinusoidal, the action of chopper 86 (FIG. 4) is on or off so that the negative square wave as shown in FIG. 2b is produced whose frequency $f_1$, and timing is controlled by oscillator 89. There is no phase shifter between oscillator 89 and chopper 86 so that the signal output to chopper 61 is in phase with oscillator 59. The other two modulation signals are adjusted in phase to the negative square wave the chopper 86 develops.

Reference phase shifter 93 also after buffer amplifier 90 is connected to reference amplifier 94 which, in turn, is connected to the second input of phase detector 63. Phase shifter 93 has a reference delay control 93a that adjusts the amount of phase shift. The signal from oscillator 89, is amplified by buffer amplifier 90, and then passes through phase shifter 93 where it experiences a phase shift determined by the setting of reference delay 93a. Thereafter it passes through reference amplifier 94 where it is again amplified to a level determined by the setting of amp control 94a which is adjusted for proper operation of phase detector 63.

Buffer amplifier 91 is connected to modulation phase shifter 95 which is connected to multivibrator 96. Multivibrator 96 is controlled in frequency by the signal it receives from oscillator 89 through amplifier 91 and phase shifter 95. The precise timing of the square waves generated by multivibrator 96 is adjustable by a modulation control 95a which sets phase shifter 95. Modulation width control 96a adjusts the reset time of the multivibrator 96 that permits varying the relative duration of positive and negative alterations of the negative square wave output that is fed into R.F. generator 58 to which multivibrator 96 is connected.

It is apparent that any two of the three outputs of unit 60 must be adjustable in phase to the third output.

As stated above, the R.F. generator 58 may be any signal generator of sufficiently high frequency that is capable of taking square wave modulation such as the Hewlett-Packard model 606A or model 608C.

The A.C. amplifier is a narrow band amplifier whose center frequency $f_1$ is the modulation frequency. It is transformer coupled to the bridge output as shown in FIG. 6. The transformer 97 has a high turns ratio and in conjunction with input tube 98 provides a low noise input for amplifier 62. Capacitors 99a and 99b have large equal values and are used to block the D.C. voltage of the bridge 51. The gain of the amplifier is high, about 100 million, to bring the noise at the amplifier 62 input to the order of volts at the amplifier output. A gain control 100 permits the reduction of the gain when maximum sensitivity is not required.

The phase detector, 63, can be any of several designs. Schuster in the Rev. Sci. Inst. 22, p. 254 (1951) gives the basic circuit used in the phase detector 63 shown in FIG. 7. In the same diagram the elements of low pass filter 64 are shown. The resistors 101 and 102, in series with capacitor 103, provide a long time RC circuit that serves as a low pass filter. A time constant of about 10 seconds was found convenient. The null meter 65 is a zero centered vacuum tube voltmeter that has a very high input resistance.

A bolometer mount 59 is shown schematically in FIG. 8. In this mount there are two bolometer elements 52a and 52b. Such bolometer mounts are commercially available and their description may be found in the publications of their manufacturers, i.e., Narda catalog, 1957, pages 13–17. Other types of mounts with somewhat different D.C. and A.C. connections may be used with the same fundamental arrangement shown in FIG. 1.

The system of FIG. 1 as thus far described requires a human operator to observe the null meter 65 and to adjust controls 61a etc. of negative square wave source 61 until the null meter 65 comes to zero. This human operator may be replaced by the mechanism shown in FIG. 1 to balance the bridge. In this automatic system the output voltage of low pass filter 64 is fed into servo control 126 which actuates the various controls 61a etc. through suitable electromechanical linkage 127 to automatically adjust negative square wave source 61 to balance the bridge for R.F. power. Servo control of resistance networks for null balancing are widely used in digital indicating voltmeters and other instruments and these techniques may be readily applied here.

Measurements of R.F. power at the millimicrowatt level ($10^{-9}$ watts) have been made with commercially available bolometers operating with about 0.015 watt excitation power and given a dynamic range of measurement of about 10 million to 1 (or 70 db). The same apparatus with the R.F. generator 58 changed to a UHF, VHF, or microwave frequency generator and the bolometer mount 59 and bolometer 52 changed to a model corresponding to the same frequency band would operate just as well so that the term R.F. applies here generally to coherent electromagnetic radiation as it often does in technical literature.

It is apparent the resistance of the bolometer when the bridge is balanced, when null meter 65 is zero, remains constant throughout the modulation cycle and that the resistance of the bolometer is not altered by the level of R.F. power.

The system of FIG. 1 may be modified to a direct reading modulated optical bridge by changing the nature of several of the units while retaining their basic function. FIG. 9 shows symbolically the parts of a system for measuring light power that differ from those used for radio frequency radiations. Parts in FIG. 9 functionally corresponding to parts in FIG. 1 are similarly designated, the numbers bearing primes in FIG. 9 however. The optical source 58′ and the optical bolometer 52′ in its mount 59′ as well as motor driver 96′ in a modified synchronizing circuit 60′ are analogous to the elements having corresponding numbers in FIG. 1. Light source 104 generates light, and a beam 105 of that light is collimated by the fixed apertures 106 and 107 in light shields 108 and 109. That beam passes through an arcuate aperture 110 in chopper disk 111 that is rotated by synchronous motor 112. The aperture 110 is shaped and positioned to pass the beam 105 for a portion, i.e. one-half of the cycle of rotation of the disk 111. The motor 112 is powered and timed by A.C. currents received from motor driver 96' that develop the power and relative phase in the motor driving currents from the signal it receives from modulation phase shifter 95'.

Because of the rotation of disk 111, aperture 110 periodically moves into and out of the light beam 105 and thereby periodically interrupts or "chops" the light beam 105 from full amplitude or intensity to no amplitude, giving the beam square wave modulation of optical power corresponding to the square wave R.F. power (FIG. 2a). Phase shifter 95' makes the synchronization of the optical power square wave adjustable to the square wave modulation of the excitation power (FIG. 2b). The chopper disk 111 is preferably constructed of two similar disks superimposed. By angularly shifting the two disks relative to one another about their common axis the length of aperture 110 can be adjusted to give an effective modulation width control to the optical power square wave.

The chopped light beam 105 falls on optical bolometer 52' and periodically changes its resistance. The subsequent operation of the optical bridge is similar to the R.F. bridge. The operation of this optical bridge is independent of the wave length of light employed and will function in the ultraviolet and infrared as well as the visible region with appropriate bolometer elements. The term "optical" refers generically to incoherent electromagnetic radiation extending from the infrared to the ultraviolet. This embodiment of the invention also illustrates the operation of a direct reading modulated power bridge with a continuously operating original source of power and a power chopping means between that continuous source and the sensing element, here a bolometer, that makes the modulated power meter applicable to such sources.

Referring to FIG. 10, there is illustrated a block diagram of a direct reading modulated power meter for pulse power measurements. In this bridge the timing of a pulsed R.F. power source 58" is self-contained or from sources other than the bridge. However, it generates a train of R.F. pulses whose repetition rate is approximately known. (In microwave commercial equipment 1000 cycles per second is commonly used.) This bridge illustrates the operation of a direct reading modulated power bridge in which the power to be measured also supplies the basic timing for the bridge.

The R.F. pulses from the source 58" go into a power divider 114, such as a directional coupler, in which only a small fraction, i.e., 0.01 or less, is transferred to the mixer 115 of a receiver 116. The greatest part of the R.F. power is transferred to a bolometer 52". A local oscillator 117 sends a signal to the mixer 115 that beats the R.F. pulses down to the frequency of the I.F. amplifier 118 into which the mixer 115 feeds. The I.F. amplifier output feeds a second detector 119 wherein pulse envelopes are produced. These pulses are fed into a video amplifier 120 whose output is a train of positive video pulses. The video pulses are fed into a variable delay line 121 as well as an inverting limiter 122. The negative pulse output of the inverting limiter 122 is monitored by a peak reading voltmeter 123 and fed into an adjustable attenuator 124. The attenuator shows a constant resistance for different values of attenuation to the output of D.C. excitation amplifier 57" and the bridge 51" to which it is connected at junction 56". The amplitude of the negative video pulse is $E_s$. This amplitude is made constant by the limiter 122 that also clamps the upper level to a ground reference. The pulses periodically depress the D.C. excitation voltage $E_{dc}$ by their amplitude $E_s$.

The time delay of the negative video pulses by the R.F. receiver 116 and the attenuator 124 is very small and comparable to the delay of the R.F. pulse from power divider 114 along the transmission line 125 to the bolometer 52". The R.F. pulses absorbed by bolometer 52" increase its temperature while the simultaneous reduction in excitation power decreases the temperature. Control 124 of attenuator 124 is calibrated and can be adjusted to set the value of $E_s$ so that the two powers balance and there is no increase or decrease in the temperature of bolometer 52". The R.F. power can be established from the value of $E_s$ which can be determined by reading the peak voltmeter 123, the setting of control 124a on attenuator 124, as well as D.C. meter 66". The formulas given for the bridge with square wave modulation are for instantaneous power and so apply here also.

The D.C. balance of bridge 51" is maintained by D.C. excitation amplifier 57 as described above in connection with the bridge of FIG. 1.

When the reduction of excitation power is not equal to the R.F. video power, the bridge 51" feeds a small video pulse to the A.C. amplifier 62". The A.C. amplifier 62" as stated above is a narrow band high gain amplifier. Its center frequency is approximately equal to the repetition frequency of the R.F. pulse train of power source 58". The output of A.C. amplifier 62" is therefore a sine wave whose frequency is equal to the pulse repetition frequency and whose phase corresponds to the polarity of the video pulse at the output of bridge 51". The phase detector 63" employs two pentode switches (e.g. 6AS6). Such a detector is described in "Waveforms" by Britton Chance et al., McGraw-Hill, 1949, p. 516. The positive video pulses from delay line 121 are also fed into the detector 63" and are applied to the suppressor grids of two pentodes that are driven push-pull by the signal from the A.C. amplifier 62". The delay in delay line 121 can be adjusted by control 121a so that the positive video pulses applied to the phase detector 63" are centered on the maximum (or minimum) value of the sinusoidal input from the A.C. amplifier 62".

It is apparent that the receiver 116 and delay line 121 perform some of the functions of the synchronizing circuits and phase shifter 60 of FIG. 1, while the voltmeter 123 and attenuator 124 perform some of the basic functions of the negative square wave source, 61, of FIG. 1.

The method of the direct reading modulated power measuring system 50 of FIG. 1 can be utilized to measure optical or infrared radiant power as shown above. This method can be employed not only for different kinds of power but also for different sensing means such as thermocouples or Golay cells. FIG. 11 is a block diagram of a direct reading modulated power meter with a Golay detector. The basic detector in this system is a modified Golay cell 130. A beam of radiant energy 131 from some continuous source is "chopped" by the rotation of aperture 110' in chopper disk 111' that is driven at a frequency $f_1$ by synchronous motor 112' which is powered by synchronizing circuits and phase shifters 60''', a system similar to that described above in connection with FIG. 9. The intermittent beam 131 passes through arcuate window 132 in the disk 110' and falls on a radiation absorbing film 133 in the Golay cell 130 and is there absorbed. This causes the film 133 to increase in temperature which, in turn, warms the gas within cell 130 causing it to expand. The expansion of the gas causes flexible mirror 134 to deflect. A beam of light 135 that originates in a lamp 136 is focused by lens 137 and 138 passes through a line grid 139 and is refocused by meniscus lens 140 and falls on the reflecting surface of flexible mirror 134 whence it is reflected. The reflected beam of light 141 passes back through the optical elements 140, 139, 138, and 137. It is then reflected by fixed mirror 142 into photo-detecting cell 143. The line grid 139 is traversed twice by the light beam 135 on its way to, and the reflected beam 141 on its way from flexible mirror 134 which, in conjunction with meniscus lens 140, form an image of the clear portion of the upper half of the grid 139 on the opaque portions of the lower half, slightly out of focus. As the flexible mirror 134 moves with the pressure of the gas in the cell 130, the image moves in and out of focus, thus affecting a modulation of the amount of light reaching the photocell 143.

The photocell 143 converts the energy of its incident light beam 141 into electrical signals that are fed into a low noise preamplifier 144 where they are amplified. An A.C. signal is fed into a narrow passband amplifier 62'' whose center frequency is $f_1$, the fundamental of the modulation of the beam of radiant energy 131.

A D.C. signal from preamp 144 is fed into a D.C. excitation amplifier 57''', similar to D.C. excitation amplifier 57 of FIGURE 1 except that a feedback network 145 has been added to supplant the feedback of the bridge. The preamp 144 also sends a signal to light level meter 146 that indicates the intensity of illumination of the light falling on photocell 143. D.C. insertion control 57a''' of the D.C. excitation amplifier 57''' described in connection with FIGURE 3 adjusts the voltage $E_{dc}$. This voltage $E_{dc}$ is applied to resistor 150 which is located within the Golay cell 130. The resistor 150 has resistance R so that the electrical power, $$\frac{E_{dc}^2}{R}$$

the resistor receives is converted to heat and warms the gas in Golay cell 130 which causes a steady displacement of flexible mirror 134. $E_{dc}$ may be adjusted by control 57a''' so that flexible mirror 134 is positioned for the incident light beam 141 on photocell 143 to be at some intermediate position between maximum and minimum values. This value of $E_{dc}$ may be read on D.C. meter 66''', a vacuum tube voltmeter that reads peak voltage and is connected to the output of D.C. source 145 at junction 56'''. This also controls the level of illumination on photocell 143 that may be read on light level meter 146. This indication serves to guide the fine adjustment of control 57a'''. The D.C. signal from the preamp 144 into the D.C. excitation amplifier 57''' maintains the setting of the illumination level.

A negative square wave source 61''' (similar to its analog of FIG. 1) supplies a negative square wave voltage $E_s$ to resistance 150 through junction 56'''. This periodically reduces the electrical power to cell 130 by an amount $$\frac{E_s(2E_{dc}-E_s)}{R}$$

The value of this periodic reduction in power can be adjusted by control 61a''' that adjusts the value of $E_s$. Synchronizing circuits 60''' is connected to negative square wave source 61''' and synchronizes the negative pulses $E_s$ so that they are simultaneous with the pulses of radiant power in beam 131. The periodic reduction in electrical power can be adjusted to be equal to the periodic gain in radiant power so that the total power change in Golay cell 130 is zero. This condition can be observed on null meter 65'''.

When the periodic reduction in electrical power is less than the periodically applied radiant power in Golay cell 130, a periodic change in the light beam 141 is produced that causes a square wave output from photocell 143. The preamp 144 and A.C. amplifier 62''' amplify this signal greatly and the narrow bandpass of the A.C. amplifier 62''' extracts the fundamental of the signal which it applies to phase detector 63'''. The phase detector 63''', low pass filter 64''' and null meter 65''' operate similarly to their analogs of FIG. 1 and the null meter 65''' indicates a positive voltage. When the periodic reduction in electrical power is greater than the square wave of radiant power, the null meter 65''' indicates a negative voltage. When the null meter reads zero, the periodic reduction in electrical power is equal to the periodically applied radiant power and is a measure of it.

From the above, by anology to the situation described in connection with the arrangement of the chopper switched shunt of FIGS. 4 and 4a it will be seen that $$P_r=\frac{E_s 2(E_{dc}-E_s)}{R}$$

where $$E_s=\frac{E_{dc}R_2 R_t}{R_1^2\left(1+\frac{R_t}{R_1}\right)\left(1+\frac{R_t+R_2}{R_1}\right)}$$

and $$R_t=\frac{R_d R}{R_d+R}$$

and where $P_r$ is the radiant power, R is the resistance of resistor 150, and $R_d$ is the output resistance of the D.C. excitation amplifier 57'''.

Several modifications of the present invention have been shown and described in great detail. It will be understood by those skilled in the art that these and other modifications within the scope of the claims are possible within the scope of the present invention.

I claim:

1. A power meter for measuring small amounts of electromagnetic energy comprising any energy sensing means capable of sensing energy by changing electrical resistance, said energy sensing means forming one arm of a bridge, means to apply a direct current voltage to said bridge, means to sense the direct current balance of said bridge and automatically control said direct current voltage to maintain said bridge balanced in spite of ambient temperature fluctuations, means to direct the energy to be measured onto said energy sensing means, energy modulating means in the path of said energy to periodically block and unblock said energy before it is sensed, means to periodically reduce said direct current voltage synchronously with each sensing by said energy sensing means of said electromagnetic energy, an alternating current amplifier connected to the output of said bridge, said amplifier being tuned to variations of bridge balance at the frequency of said energy modulating means, means to automatically vary the amount of periodic reduction in said direct current voltage in such a direction as to minimize the output of said alternating current amplifier, and means to measure the amount of said periodic reduction in said direct current voltage as a measure of said energy.

2. A power meter for measuring small amounts of electromagnetic energy comprising a bolometer bridge having input and output terminals and containing as a bridge element at least one bolometer element whose resistance changes with changes in energy applied thereto, an energy modulating means for modulating the energy to be measured in a repetitive pattern arranged to affect the energy so that the energy will be alternately sensed and alternately suppressed from said bolometer, means to apply a direct current excitation voltage to said input terminals, a direct current amplifier connected to said output terminals for detecting low frequency changes in bridge balance and means to vary said direct current voltage in response thereto, means to periodically reduce said direct current excitation voltage synchronously with each sensing by said bolometer of said electromagnetic energy, an alternating current amplifier connected to the output of said bridge, said amplifier being tuned to variations of bridge balance at the frequency of said energy modulating means, a phase detector for comparing the phase of the output of said alternating current amplifier with the phase of said energy modulating means and means to vary the amount of periodic reduction of said direct current excitation voltage in response to the output of said phase detector until the alternating current output of said bridge is minimized, and means to measure said amount of reduction of said direct current excitation voltage as a measure of said electromagnetic energy.

References Cited by the Examiner
UNITED STATES PATENTS

| | | | |
|---|---|---|---|
| 2,434,334 | 1/48 | Sheppard | 324—95 |
| 2,437,449 | 3/48 | Ames | 324—95 |
| 2,618,674 | 11/52 | Stanton | 324—120 |
| 2,735,067 | 2/56 | Deibler | 324—95 |
| 2,989,700 | 6/61 | Most | 324—120 |

FOREIGN PATENTS 710,378   6/54   Great Britain.

WALTER L. CARLSON, *Primary Examiner.*

BENNETT G. MILLER, *Examiner.*